Oct. 17, 1967    A. G. STIMSON ETAL    3,348,054
PHOTOELECTRIC EXPOSURE CONTROL SYSTEM FOR CAMERAS
Original Filed April 13, 1964
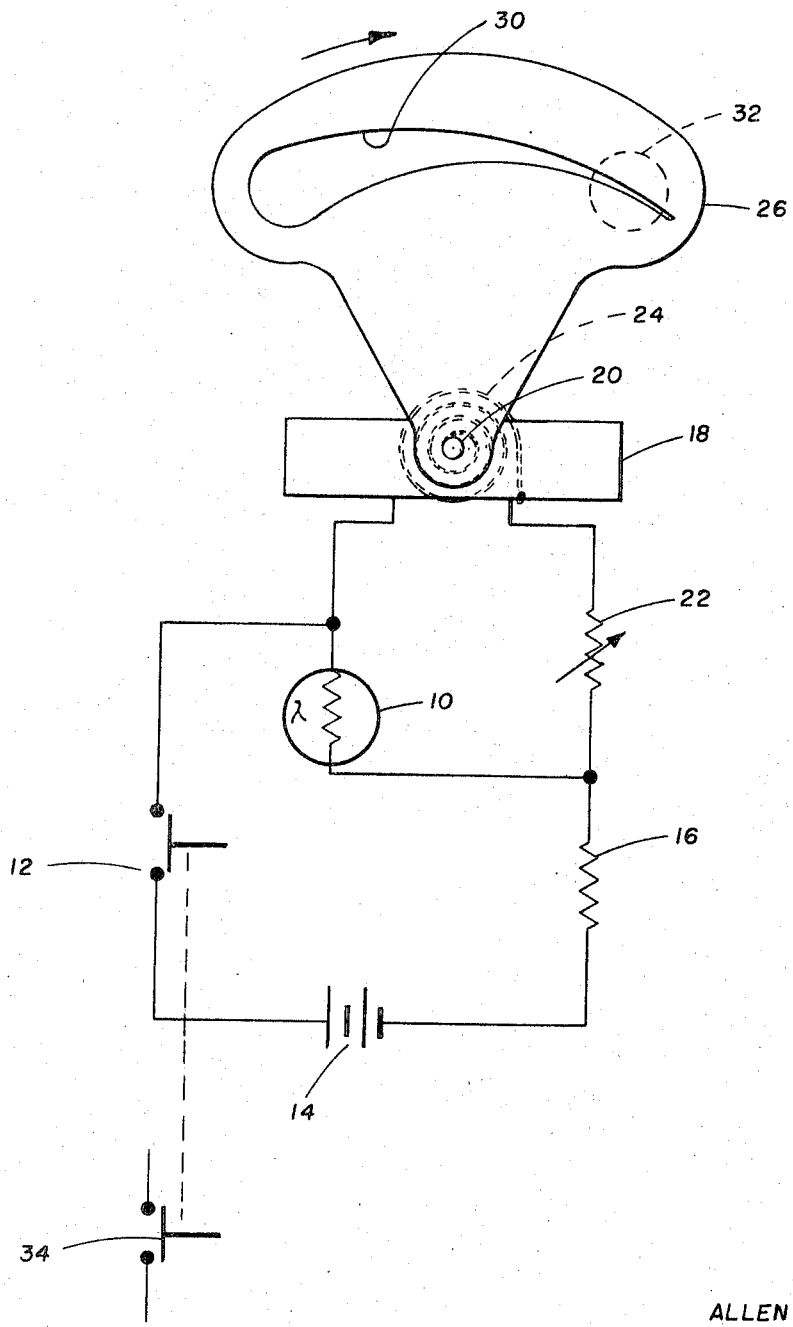
ALLEN G. STIMSON
GERALD F. PICKENS
    INVENTORS
BY *R. Frank Smith*
    *Robert W Hampton*
        ATTORNEYS

United States Patent Office 3,348,054
Patented Oct. 17, 1967

3,348,054
PHOTOELECTRIC EXPOSURE CONTROL
SYSTEM FOR CAMERAS
Allen G. Stimson and Gerald F. Pickens, Rochester, N.Y., assignors to Eastman Kodak Company, Rochester, N.Y., a corporation of New Jersey
Continuation of abandoned application Ser. No. 359,283, Apr. 13, 1964. This application Jan. 18, 1967, Ser. No. 610,202
2 Claims. (Cl. 250—206)

ABSTRACT OF THE DISCLOSURE

An exposure control for use with ambient as well as flash illumination wherein the diaphragm vane initially moves toward an open position but is limited by the subject illumination, thus rendering correct exposure for flash as well as ambient lighting.

---

This application is a continuation of application Ser. No. 359,283, filed Apr. 13, 1964, and now abandoned.

The present invention relates to photoelectric exposure control systems for cameras and more particularly concerns a system of this type in which a lens diaphragm is automatically positioned under photoelectric control in both daylight and flash operation of the camera.

A primary object of the invention is to control the position of a lens diaphragm photoelectrically under both daylight and flash conditions.

Another object of the invention is to energize an instrument coil under photoelectric control such that the coil receives maximum energization at minimum scene brightness.

Other objects of the invention will appear from the following description, reference being made to the accompanying schematic drawing of one embodiment of the invention.

A photoresistive device 10, for example, a cadmium sulfide photocell, is positioned for illumination by scene light and is connected in series with a switch 12, a battery 14 and a resistor 16. When switch 12 is closed, battery 14 supplies current through cell 10, limited by the resistance of the cell and that of resistor 16. As is well known, the resistance of a cadmium sulfide cell is an inverse function of its illumination. Therefore, when switch 12 is closed, increased illumination of cell 10 by scene light lowers the resistance of the cell and battery circuit, increasing the current through that circuit. This, in turn, increases the voltage drop across resistor 16, thereby decreasing the voltage across the cell.

A coil 18 of an electric measuring instrument is pivoted at 20 and has one terminal connected to switch 12 and the other terminal connected to resistor 16 through a variable calibrating resistor 22, whereby the coil is connected across battery 14 in parallel with cell 10 and is energized by the voltage across the cell. Energization of coil 18 deflects the coil clockwise against the tension of a spring 24. Accordingly, an increase in scene brightness, which decreases the voltage drop across cell 10, results in decreased energization of coil 18, permitting spring 24 to deflect the coil counterclockwise.

A diaphragm vane 26 is supported by coil 18 and has a tapered aperture 30 cooperating with the taking lens 32 of the camera. As coil 18 is deflected, it carries the diaphragm vane 26 with it, thereby aligning different portions of aperture 30 with lens 32 to regulate exposure of film in the camera in accordance with scene brightness.

In operation, switch 12 is closed, thereby applying battery voltage across cell 10 and resistor 16. In daylight operation, the scene illuminates cell 10 and establishes its resistance accordingly. This establishes a corresponding current through cell 10 and resistor 16 and corresponding voltage drops across the cell and resistor, thereby controlling the energization and deflection of coil 18 and the position of vane 26 in accordance with scene brightness.

In flash operation, closure of switch 12 simultaneously closes a flash switch 34 to ignite a flash bulb for illuminating the scene. Reflection of this illumination from the subject decreases the resistance of cell 10 from its value prior to the flash, and the diaphragm vane is set to a position corresponding to scene brightness.

It has been found that the inertia of the moving system, including coil 18 and vane 26, can be kept sufficiently low, for example, by forming the vane from a thin sheet of aluminum, so that the vane is position early in the flash period and the film exposure can be regulated automatically in flash operation as in daylight operation.

It will be understood that a conventional camera shutter normally protects the film from exposure and is opened for a predetermined exposure time in synchronism with closure of switch 12. The shutter and its control are well known in the art and, for simplicity of illustration, are omitted from the drawing.

The invention has been described in detail with particular reference to a preferred embodiment thereof, but it will be understood that variations and modifications can be effected within the spirit and scope of the invention as described hereinabove and as defined in the appended claims.

We claim:
1. In a photoelectric exposure control system for a camera having a movable diaphragm vane and an electric measuring instrument for positioning said vane in accordance with energization of said instrument, and being adapted to take photographs by flash illumination, said vane providing minimum aperture when said instrument is unenergized, the combination comprising: a closed series loop comprising a photo-resistive element illuminatable by scene light, a battery, a switch and a resistor connected in series with said element effective, upon closure of said switch, for applying across said element a voltage inversely related to illumination of said element; and circuit means connecting said element across said instrument, for energizing said instrument in direct proportion to the voltage across said element, so that said diaphragm vane is at its minimum exposure position at the beginning of an exposure, and tends to proceed toward a greater exposure, thus insuring against overexposure if the flash illumination is bright.

2. The combination defined in claim 1 with a variable resistor in said circuit means for selectively controlling energization of said instrument.

References Cited
UNITED STATES PATENTS

| | | | |
|---|---|---|---|
| 2,755,704 | 7/1956 | Gilbert | 88—23 |
| 3,106,141 | 10/1963 | Estes | 95—10 |
| 3,176,312 | 3/1965 | Reinsch | 88—23 |
| 3,218,917 | 11/1965 | Foersterling et al. | 88—23 |
| 3,222,529 | 12/1965 | Askowith | 250—206 X |
| 3,225,646 | 12/1965 | Nagai | 88—23 |

RALPH G. NILSON, *Primary Examiner.*

M. A. LEAVITT, *Assistant Examiner.*